Nov. 8, 1938.     O. A. WIRKKALA     2,135,994
MATERIAL HANDLING DEVICE
Filed July 28, 1933     2 Sheets-Sheet 1

Oscar A. Wirkkala
INVENTOR
Oscar A. Wirkkala
BY

ATTORNEY

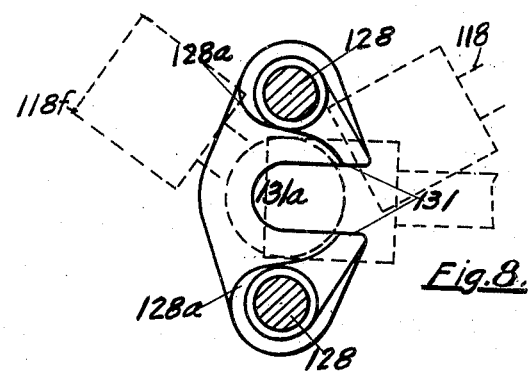
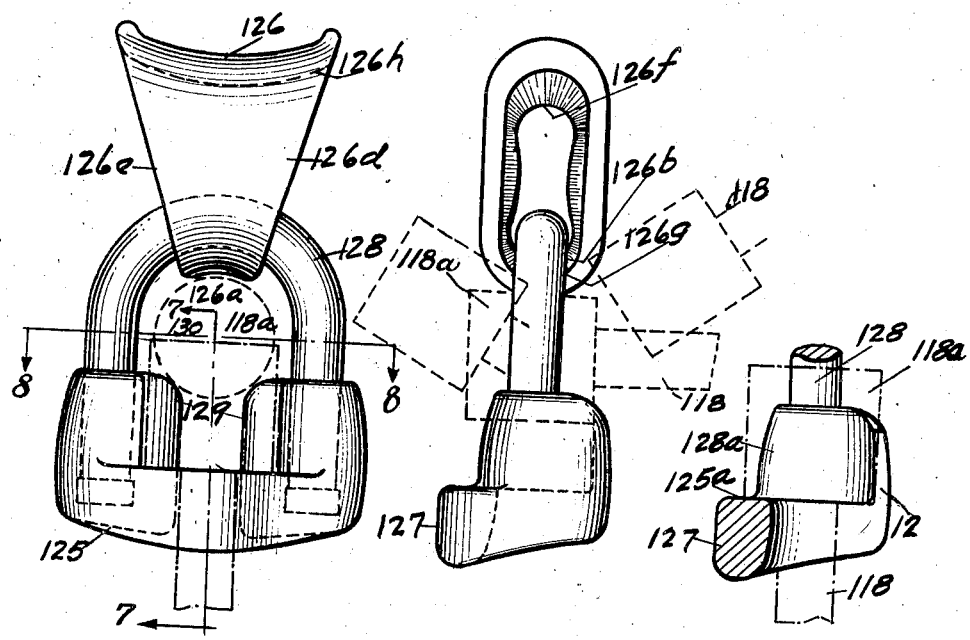

Patented Nov. 8, 1938

2,135,994

UNITED STATES PATENT OFFICE 2,135,994

MATERIAL HANDLING DEVICE

Oscar A. Wirkkala, Seattle, Wash.

Application July 28, 1933, Serial No. 682,683

7 Claims. (Cl. 294—78)

This invention relates, generally, to devices applicable to a variety of material handling operations. In the use of such equipment objects of various sizes and shapes are secured by said equipment and sometimes suspended in and transported through the air for greater or lesser distances depending upon the nature of the material being handled.

An object of my invention is to so design this device that the lines or handling wires used may be quickly and easily connected and disconnected to this device, and to provide for their positive retention therein and against accidental disconnection from said device, and to design into the structure means to facilitate these objects.

It has also been a desirable object to so design the portions of this device through which wire rope, and such handling cables pass, as to minimize the bending stresses at present set up within said cables by hooks of present design due to bending them around to small radii, and I have also provided for adequate bearing surfaces where cables are apt to slide or have frictional contact with said device thereby causing wear and crystallization in metal cables, and further to so design all parts that they have stresses properly distributed to resist the operating loads imposed upon them.

A further and very important object to be provided for, as a means of users reducing operating costs by this device, is the complete elimination of kinking of cables, and I have therefore designed this device in more than a single piece so that the parts can adjust their relative positions to equalize the pull or strain of the hauling lines and thus act as an automatic adjustment to any variation in direction of strain or pull.

A still further object is to provide a device which in service will not be likely to pick up small objects such, for instance, as brush and earth as in logging and construction operations and which will easily clean of such debris.

As stated herein this device is applicable to all kinds and classes of material handling. It has a very useful and proven field in the logging industry and, therefore, the objects may as stated above and as may hereinafter appear or be apparent and for purposes of more accurate description of use in a specific industry, be referred to those uses, and objects, and a description found particularly in this field.

The specific adaptation of this device to logging operations is as a so-called "choker hook", because it is used in co-operation with a length of wire rope called a "choker rope". On each end of this rope is attached a so-called ferrule, often variously referred to as a knob or thimble. A ferrule is a piece of metal preferably of cylindrical form, hollow inside. It is made, preferably, of the best grade of alloy steel adapted to use under the high impact duty it is frequently subjected to in service. The ferrules are slipped over the ends of the rope, the wires thereof spread out in conical form, cleaned and then molten metal, preferably zinc, is poured over and completely surrounds the wires and this metal adheres to and becomes an inseparable part of the wire rope constituting the "choker rope". This operation is called "socketing" and is very clearly set forth in my U. S. Patent No. 1,496,142. This method, or some variations thereof, has found practically universal adaptation in the rope fields industry.

Sliding upon this choker rope, between the two ends thereof, is the choker hook.

I attain these objects in my choker hook consisting of more than one piece and, in general, of a sleeve portion adapted to freely slide on a rope having retaining elements at each end and a body portion formed with a base, retaining walls and a bail member which passes through the sliding sleeve above referred to and connects with the base part and the retaining walls. The space over the base part and between the sides of the bail member and beneath the sliding sleeve is sufficient to allow easy passage of the ferruled end of the choker rope into the space above the base and lying between the bail side rods.

In its simpler form my choker hook comprises two parts, while in a different design and for different uses more parts may be used without impairing the usefulness or novel features thereof.

The sleeve portion of my hook is curved so as to slide freely along the choker rope and to also allow the rope where it leaves the sleeve to have quite a large curvature so as not to unnecessarily wear said rope.

The sleeve or sliding part of the hook has movement on said bail member relative to the angular direction of pull on the choker rope passing through the eye of the sleeve and the ferruled end of the rope bearing on the base. This flexibility allows sufficient automatic adjustment of the hook parts as to eliminate the causes of kinks in ropes, with their resultant relative high costs of replacement.

The cable ends may both be ferruled or one may be ferruled and the other terminate in a noose—in any event the ferrule is larger in diameter than the hole in the sleeve through which the cable passes thus allowing the hook to slide between the two ends without becoming disconnected.

In the event both ends are "ferruled", one end of the choker rope is passed around the log and the ferrule on this end is inserted into the "choker hook", the other ferrule on the other end being inserted in a bull hook when its carriage is brought out for a new load of logs.

In the drawings:

Fig. 5 illustrates a hook of the same general features as shown in Fig. 1 illustrating, however, the manner of using a bail member made from a separate piece of metal cast in place;

Fig. 6 is a side elevation of Fig. 5;

Fig. 7 is a partial section taken on line 7—7 of Fig. 5 and further illustrates the base portion of my hook and the retaining wall for the ferrule;

Fig. 8 is a section taken on line 8—8 of Fig. 5 looking toward the base.

Figure 4:
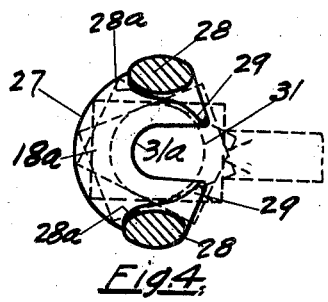
Fig. 4 is a section taken on line 4—4 of Fig. 1 looking toward the base.

My choker hook as shown in Figs. 1, 2, 3 and 4 comprises two pieces, element 25 being the body portion and a sleeve portion 26 through which a choker rope 18 is reeved. At one end of said rope is secured a ferrule 18a the diameter thereof being greater than the rope diameter and also greater in diameter than the reeveway in sleeve 26. The other end of the rope 18 is extended and at the termination of said extended end is secured a ferrule or a spliced eye may be provided. Thus the working parts consist of the combination of the body portion 25, the automatic adjusting sleeve 26, and a choker rope 18, at one end or at each end of which is attached a ferrule.

In my present choker hook the ferrule 18a may be inserted between the bail member side rods from a wide angle of approach it being unnecessary to carefully align the ferrule with the entrance hole 30. Side rods 28 of the bail member are of carefully rounded section (see Fig. 4) so as to provide maximum strength to resist operating stresses and also to give maximum strength with minimum weight, thus fulfilling the objective of easy handling, less production cost, etc.

Figures 1, 2, 3:
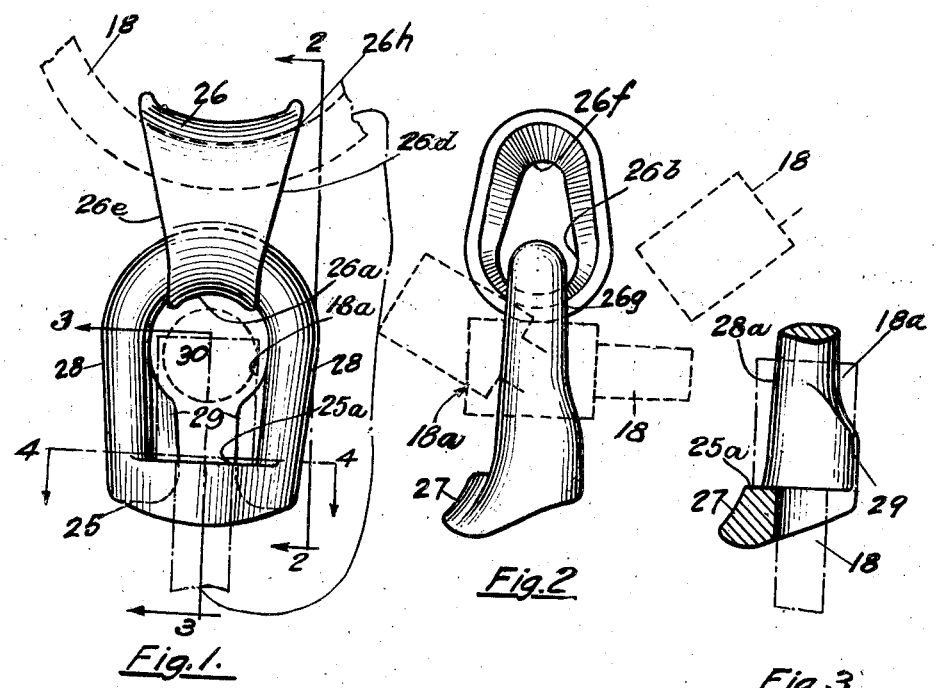
Fig. 1 is an elevation of my two piece choker hook and illustrates how the choker rope passes through the sleeve and shows one ferruled end seated upon the base of the hook.
Fig. 2 is a side elevation of Fig. 1 with the cable not shown.
Fig. 3 is a partial section taken on the line 3—3 of Fig. 1 and further illustrates the base portion of my hook and the retaining walls for the ferrule.

As shown in Figs. 1 to 4 inclusive the shoulders or retaining walls 29 extend from the base surface 25a upwardly toward the curved portion 26a of sleeve 26. The inside curvature of the sleeve 26 as seen in Fig. 2 is adapted to contact and freely move about the diametral section of bail member 28 which is preferably rounded at this central point so as to provide easy movement to the various positions the choker hook may assume in operation.

The inside of the reeveway in the sleeve 26 is also curved from side 26d to side 26e in such a manner as to permit a rocking motion of said sleeve on said bail member and a sliding movement upon the inside curvature of the sleeve 26 and also to move on the radius of curvature of bail member 28 and as shown at 26g of Fig. 2.

The walls 29 are pierced by an entrance hole 30 through which a ferrule 18a may be projected and then turned at an angle to seat on surface 25a behind walls 29 and rope 18 retained by beam 27.

The inside curvature of the wide portion of sleeve 26 forms a cable-way, and is as shown at 26h, in an easy curve to permit even distribution of loading of the choker cable and further curved as at 26f to permit easy seating and sliding of rope in said sleeve and the curvature of the inside of sleeve 26 is made to correspond with the surface at 26f, 26g and 26h and to give proper distribution of metal for requisite strength and to resist stresses imposed upon the structure.

The outside surface of sleeve 26, preferably, follows closely the shape of the interior surfaces thereof providing sufficient rigidity and strength where required.

As shown in Fig. 3 the ferrule 18a is so positioned as to bear evenly and directly upon base surface 25a. The choker rope 18 extends through the rope entrance 31 and is retained in slot end 31a formed by the curved beam 27.

The entrance hole 30 may be larger than shown so that the cable ferrule may be more easily inserted. This increase may be accomplished by reducing the heighth of the walls 29 or by increasing the length of the bail and the diameter of the hole 30. The bail may be considered to include the walls 29.

The sleeve 26 is adapted to be moved freely on the bail 28. The sleeve can slide along the curve of the bail and it can also swing from side to side upon the rounded cross-section of the bail. This allows the sleeve to have plural motion and to align itself with the resultant of the forces acting on the choker hook.

Examination of Fig. 4 will disclose the absence of any restricting elements whereby free movement of a ferrule into the space between said side rods 28 of said bail member would be prevented.

It is an important feature or object herein to provide for the insertion of the ferrule element into said space without the necessity of accurately positioning said ferrule before projecting it through entrance hole 30 in an endwise manner.

The dotted positions of the ferrule and cable shown in the figures, illustrate the ease with which the ferrule may be inserted from various angles through the opening 30.

In this type of hook the bail is formed as a part of and is integral with said base. The bottom of sleeve 26 acts as an abutment to limit movement of ferrule 18a from base surface 25a. Surfaces 28a of Fig. 4 of side rods 28 act as abutments in directing the ferrule 18a to surface 25a.

The choker hook shown in Figs. 5, 6, 7 and 8 is a three piece type wherein there is a base 125, a sleeve 126, and the bail 128. The bail is placed through the sleeve 126 and secured into said base 125 in an approved manner.

The entrance hole 130 is formed by the walls 129, the bail side rods 128 and the bottom surface of sleeve 126 which acts as an abutment surface wherein movement of the ferrule 118a from the base surface 125a is limited.

The same free entrance from a wide angle of projection is provided as described for Figs. 1, 2, 3 and 4, as also is the movement of sleeve 126 about the surfaces of bail 128.

The metal surrounding the ends of bail 128 and connecting and securing said bail to base 125 acts also as an abutment and guiding surface to direct the ferrule 118a to the surface 125a similar to the corresponding surfaces of the side rods in Figs. 1 to 4 inclusive. In fact this metal, of which 129 is a part, may be considered as part of the bail section. This separable bail may also be made of a piece of cable.

Having thus described the invention, I claim:

1. In a material handling device, a cable provided at one end with an enlargement, a sleeve adapted to permit the passage of said cable therethrough but not the enlargement thereof, a body member comprising a slotted base, a bail attached to said base, a slotted wall extending from said base and said bail and so formed relative to said sleeve as to permit the entrance of the cable enlargement between the side portions of said bail and the passage of the cable only through the slot in said wall, said wall slot communicating with the slot in the base, said bail member passing through said sleeve to permit movement there-between thereby eliminating excessive bending stresses within said cable, and distributing the load on said sleeve more equally upon said cable thereby eliminating the occurrence of destructive localized wear of said cable.

2. In a material handling device, a cable provided at its end with a retaining enlargement, a choker hook comprising a sleeve through which said cable is extended and a base with an integral bail, said bail passing through the lower interior portion of said sleeve and adapted to permit cooperative movement thereon, a transverse opening formed by said base and the side portions of said bail in cooperation with the lower exterior portion of said sleeve, and a longitudinal slot leading from said transverse opening through the base of the choker hook for receiving the cable and having its rear end closed to form a seat for said enlargement, shoulders formed along opposite edges of the open side of the slot from the seat to said transverse opening to prevent displacement of the enlargement from the choker hook except when turned at an angle to the longitudinal axis of the slot.

3. A choker hook, comprising: a bail, a base, and a sleeve; said base being formed with a portion of an elongated slot which has closed ends in said bail, a portion of said slot at an angle to said base portion being wider than other portions of said slot, said bail being secured to said base, a portion of the length of said bail being curved, and rounded in cross-section, said sleeve encompassing and having plural motion on said curved portion, and said sleeve encompassing a cable-way.

4. A choker hook, comprising: a bail, a base, and a sleeve; said bail and base forming an enlongated slot with closed ends, a portion of said slot in said bail being wider than other portions of said slot, a portion of the length of said bail being curved, and rounded in cross-section, and said sleeve encompassing and having plural motion on said curved portion, and said sleeve encompassing a cable-way.

5. A choker hook, comprising: a bail, a base, and a sleeve; said bail and base forming and having therein an elongated slot with closed ends, a portion of said slot in said bail being wider than other portions of said slot in said bail, said base being at an angle to said bail, a portion of the length of said bail being curved, and rounded in cross-section, said sleeve encompassing said bail and having plural motion on said curved portion, and said sleeve encompassing a cable-way.

6. A choker hook, comprising: a bail, a base, and a sleeve; said bail and base forming and having therein an elongated slot with closed ends, a portion of said slot in said bail being wider than other portions of said slot in said bail, said base being at an angle to said bail, a portion of the length to said bail being curved, and rounded in cross-section, said sleeve encompassing and having plural motion on said curved portion, and said sleeve being curved to fit the curve of said bail and having a curved cable-way.

7. In a material handling device, the combination of: a cable and an enlargement on one end of said cable; and a choker hook, comprising: a bail, a base, and a sleeve; said bail and base forming and having therein an elongated slot with closed ends, the width of said slot being slightly greater than the diameter of said cable and smaller than said enlargement on said cable, a portion of said slot in said bail being wider than the other portions of said slot in said bail and wide enough to pass therethru said enlargement on said cable, said base being at an angle to said bail, a portion of the length of said bail being curved, and rounded in cross-section, said sleeve encompassing and having plural motion on said curved portion, and said sleeve being curved to fit the curve of said bail and also encompassing a curved cable-way to receive said cable.

OSCAR A. WIRKKALA.